United States Patent
Raschke et al.

(10) Patent No.: US 6,375,893 B1
(45) Date of Patent: Apr. 23, 2002

(54) METHOD AND APPARATUS FOR EVAPORATING COMPONENTS OF MULTIPLE SUBSTANCE MIXTURES AND MULTIPLE SUBSTANCE SYSTEMS

(76) Inventors: Manfred Raschke, Kalkbergstrasse 34, D-63579 Altenmittlau; Wilfried Goy, Dahlienstrasse 10, D-65451 Kelsterbach; Franz Hugo, Sonnenstrasse 24, D-63743 Aschaffenburg; Erwin Wanetzky, Robert-Koch-Strasse 4, D-63538 Grosskrotzenburg; Albrecht Melber, Darmstrasse 25-27, D-64187 Darmstadt, all of (DE)

( * ) Notice: Subject to any disclaimer, the term of this patent is extended or adjusted under 35 U.S.C. 154(b) by 0 days.

(21) Appl. No.: 09/497,529

(22) Filed: Feb. 4, 2000

(30) Foreign Application Priority Data

Feb. 6, 1999 (DE) .......................... 199 04 863

(51) Int. Cl.[7] ............................... F27D 11/12
(52) U.S. Cl. ................. 266/149; 266/208; 373/141
(58) Field of Search ............... 266/149, 208; 373/141

(56) References Cited

U.S. PATENT DOCUMENTS

| | | | |
|---|---|---|---|
| 4,407,488 A | 10/1983 | Wanetzky et al. | 266/148 |
| 5,098,069 A | * 3/1992 | Wanetzky et al. | 266/149 |
| 5,121,406 A | * 6/1992 | Hugo et al. | 373/141 |

FOREIGN PATENT DOCUMENTS

| | | |
|---|---|---|
| DE | 25 33 703 | 2/1977 |
| DE | 31 44 284 | 5/1983 |
| DE | 32 39 341 | 5/1983 |

* cited by examiner

Primary Examiner—George Wyszomierski
(74) Attorney, Agent, or Firm—Fulbright & Jaworski L.L.P.

(57) ABSTRACT

For the evaporation of given components from initial multiple-substance mixtures and systems at subatmospheric pressure, individual portions (P1, P2, P3, P4, P5) of the multiple-substance mixture and systems are placed in ring crucibles (17) stacked at several levels. Vapors of the lower-boiling component are drawn off through a vapor exhaust opening in each crucible, while the top ring crucible (17) is closed except for its vapor exhaust opening. In order to obtain products of high purity through short diffusion path lengths and great uniformity of temperature distribution,
a) ring crucibles (17) are used which act as susceptors towards alternating electromagnetic fields,
b) heat bodies (16, 21) are arranged under and over the crucible stack, and likewise act as susceptors towards alternating electromagnetic fields,
c) the ring crucibles (17) and the heat bodies (16,21) are heated by inductive coupling, doing so
d) with such timing that at least one of the given components of the multiple-substance mixture or system is obtained in the greatest possible purity.

13 Claims, 2 Drawing Sheets

METHOD AND APPARATUS FOR EVAPORATING COMPONENTS OF MULTIPLE SUBSTANCE MIXTURES AND MULTIPLE SUBSTANCE SYSTEMS

BACKGROUND OF THE INVENTION

1. Field of the Invention

The invention relates to a method for evaporating given components from initial multiple-substance mixtures and multiple-substance systems at subatmospheric pressure in a vacuum chamber in which individual portions of the multiple-substance mixture or multiple-substance system are arranged in ring crucibles at a plurality of levels, from which vapors of the lower-boiling component in each case are withdrawn through at least one vapor exhaust duct, the topmost ring crucible being covered except for the vapor exhaust duct.

2. Description of the Related Technology

The purification of pasty, flowing, fluid or liquefied multiple-substance mixtures or systems by heating in a vacuum and evaporating relatively lower-boiling components becomes more difficult when the boiling points are close together at a given pressure (specific vapor pressure curves of the single components). The difficulties increase further when very low residual contents of the components to be evaporated are required, as for example when trace elements and/or trace compounds interfere with the application for which the purified material is intended. These applications especially appear in the fields of electronics (semiconductor technology) and optics (lens materials), the term, "multiple-substance mixtures and systems," being understood to mean alloys, glasses, sludges, etc., that is to say, multiple-substance mixtures containing solid-and-solid, solid-and-fluid and fluid-and-fluid phases.

Such multiple-substance mixtures and systems may also contain water, hydrocarbons, mercury, sulfur, zinc, cadmium, sodium, lithium, calcium, antimony, lead, manganese, selenium and tellurium.

To obtain short diffusion distances to the phase boundary surfaces (e.g., fluid-to-vapor) in the wholly or partially fluid multiple-substance mixtures and systems, it is desirable to divide the charge into single portions at several levels with a shallow depth of fill and a favorable ratio of surface area to volume, as is described in connection with resistance heating in DE 31 44 284 C2, which deals with a different subject, namely the embrittlement of hard metals in machining technology. In a stacked arrangement, however, temperature equalization is lost due to convection flows and/or inductive stirring between the individual portions. The consequence is considerable axial and radial temperature differences between the single portions or levels in the stack and thus different amounts of residual impurities in the individual portions, even in the radial direction.

When the entire charge is held in a single crucible, convection flows and/or inductive stirring can produce uniformity, to a certain extent, of temperature and composition of the charge axially and radially. However, convection flows presume temperature differences, and in both cases certain torus-like flow patterns develop, and individual elements of the volume of the liquid are momentarily in the vicinity of the phase boundary (evaporative surface). On average, with respect to the amount of the charge, considerably long diffusion paths are formed, and production suffers. Upon cooling, the melt gradually "freezes" and the solid-to-liquid phase boundary pushes particular impurities ahead of it into the liquid part—the so-called residual melt—and thereby causes gradients in the impurities in the block that finally solidifies. That is a consequence of the action of the effective coefficient of distribution.

$$k_{eff} = C_{solid}/C_{liquid}$$

In this case the removal of the heat of solidification over great distances is troublesome. Moreover, the migration of the phase boundary presumes temperature differences.

Now, it is common practice to perform such processes in vacuum furnaces which have a cylindrical wall made of a material permeable to magnetic fields, such as quartz or plastic (glass fiber-reinforced) and an induction coil arranged outside of the furnace wall.

Now, it is not possible in all cases to hit upon the temperature selection for fractional distillation on the basis of isolated considerations of the specific equilibrium vapor pressure curves of the substances, since such evaporations take place under "non-equilibrium conditions." Evaporation under such conditions represents the typical, real case with which one has to deal in practice. The evaporation process as a whole is considered to be a transporting of components out of the bulk into the vapor phase, or into the vacuum in some cases, in specific steps, and both the whole process and each individual step can be characterized by specific kinetic parameters. The first step is the transport of the particular component through the diffusion boundary layer, and this transport is proportional to the concentration gradient in this boundary layer. The second step is the free evaporation of the particular component at the surface, and this evaporation is proportional to the concentration of the component at the surface.

At the same time, however, the individual components exercise different interactions with one another, which shift the values from the equilibrium vapor pressure curves against one another. In the case of alloys, this takes place, for example, by the formation of intermetallic phases. These interactions must and can be determined experimentally.

See in this connection the book, "Metallurgische Thermochemie," by Kubaschewski and Evans, 1959, VEB Verlag Technik, Berlin, pages 53 to 55, in which the authors deal with the concept of "activity" of the substances and components in a solution and refer to bonding and attraction forces between the molecules which have to be overcome, and to repulsive forces which can be exploited.

The individual problems and their possible solutions and effects are therefore diametrically opposed.

SUMMARY OF THE INVENTION

The invention is therefore addressed to the problem of offering a method and an apparatus by which short diffusion path lengths and great uniformities in the temperature configuration in the radial and axial directions are possible.

The solution of the stated problem is therefore accomplished according to the invention in the method described above by the fact that:
a) ring crucibles of a material which acts as a susceptor towards alternating electromagnetic fields,
b) under the lowest ring crucible and over the topmost ring crucible a heat body is disposed, made of a material which likewise acts as a susceptor towards alternating electromagnetic fields,
c) the ring crucibles and the heat bodies are contained in at least one induction coil and are heated by the inductive coupling such that the lowest ring crucible and the top ring crucible are additionally heated by the heat bodies, and d) the ring crucibles are heated with timing such that at least one of the given components of the multiple-substance mixture or system is obtained in the greatest possible purity.

Thus the advantages are achieved that short diffusion path lengths and great uniformities in the temperature configuration in the radial and axial direction are possible, and especially that the axial and radial temperature differences between the individual portions or stack levels are extremely small, so that the residual impurity contents in the individual portions can be minimized, even in the radial direction.

The collection of the high-purity component can be accomplished in two alternative ways, namely,
1. by holding back the given component or components in the ring crucibles, or
2. by capturing the given component or components in a condenser independent of the other components. In this case a condenser is used that is not already "occupied" by other substances.

The invention also relates to an apparatus for evaporating given components from initial multiple-substance mixture and system at subatmospheric pressure with a vacuum chamber and a furnace wall in which ring crucibles are arranged at various levels, each crucible having a vapor exhaust passage, while the topmost ring crucible is closed except for the vapor exhaust passage.

The solution of the stated problem is achieved by the invention, therefore, in the apparatus described above in that
a) the ring crucibles consist of a material which acts as a susceptor of alternating electromagnetic fields;
b) under the lowermost ring crucible and above the topmost ring crucible there is disposed at least one heat body made of a material which likewise acts as a susceptor of alternating electromagnetic fields;
c) the furnace wall, the ring crucibles and the heat bodies are surrounded by at least one induction coil, and
d) the lowermost ring crucible and the topmost ring crucible are in thermal exchange with the heat bodies.

It is furthermore especially advantageous, as a result of further developments of the subject of the invention if, either individually or in combination:
the heat bodies are in the form of hollow bodies and if their inside surfaces are in visual contact with a cover of the topmost ring crucible and with the bottom of the lowermost ring crucible,
the height of the bottom heater, the height of the crucible stack and the height of the upper heat body are in a ratio of 1:(0.8 to 2.0):1,
the height of the crucible stack is in a ratio to its outside diameter of 1:(0.2 to 1.5),
the heat bodies are in the form of hollow cylinders,
the top heat body is closed off at the top by a thermal insulating device,
the bottom heat body rests on a ring plate made of a susceptor material, which in turn is disposed on a hollow cylindrical thermal insulating device,
the induction coil consists of a spiral metal band and its cross section in the middle of the axial length of the induction coil is greater than at the ends of the induction coil,
the cross section of the induction coil is a rectangle, if the gaps between the windings on the entire length of the metal band are at least substantially equal, and if the longest axis of the rectangle is axis-parallel and in the center of the coil has a maximum dimension and at the ends of the coil has a minimum dimension,
the induction coil consists of a hollow profile,
the ratios of the greatest to the smallest dimension amount to between 1.1 and 4.0.
the vapor exhaust duct runs from the bottom of the lowermost ring crucible through the ring plate and the thermal insulating device to a condenser, and/or
the furnace wall consists of a quartz tube which is lined on its interior with a thermal insulation of a soft felted material.

BRIEF DESCRIPTION OF THE DRAWINGS

An embodiment of the invention will be explained below with the aid of FIGS. 1 and 2.

DETAILED DESCRIPTION OF THE PREFERRED EMBODIMENT

Figure 1:
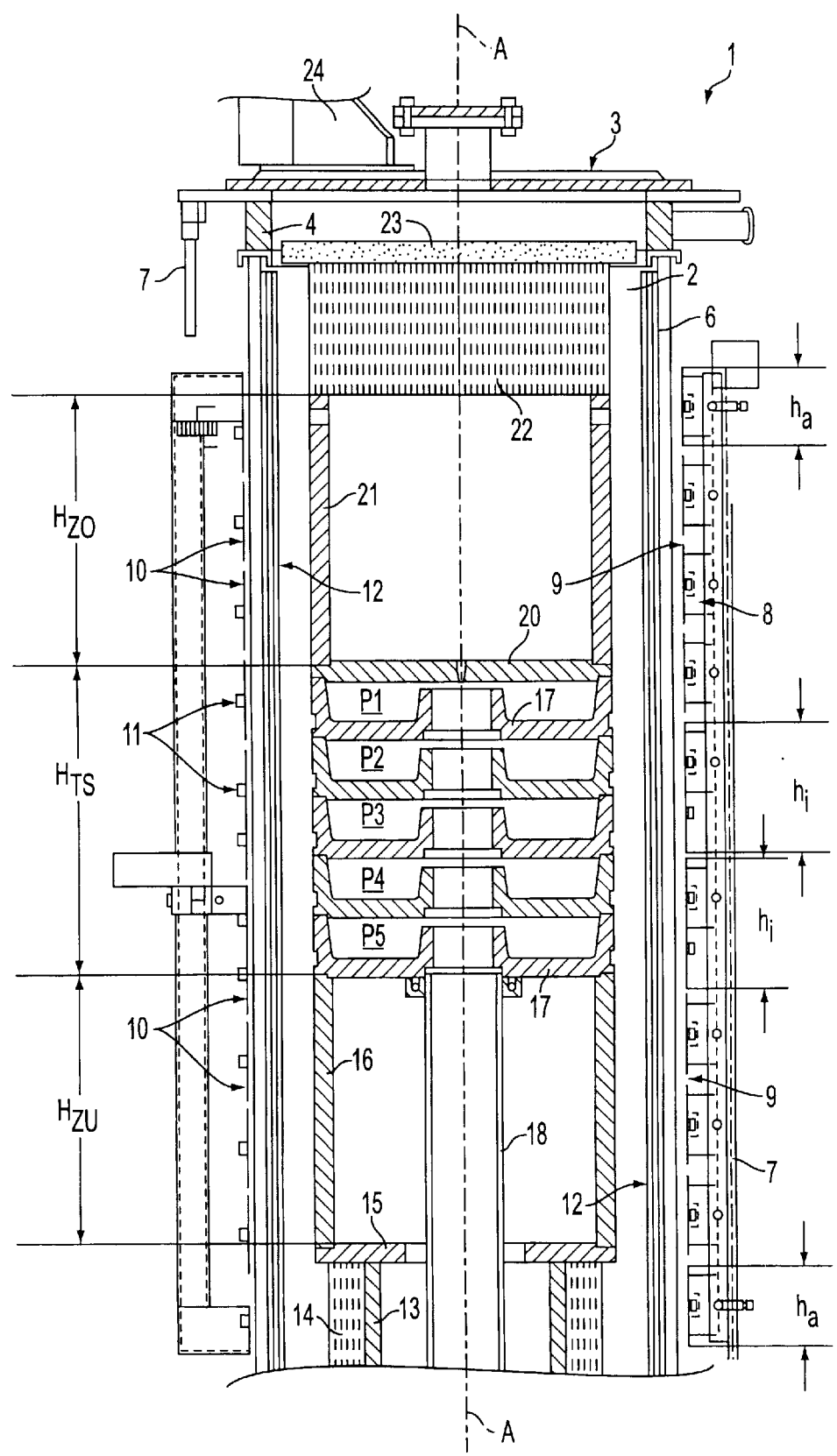
FIG. 1 shows a vertical axial section through the part of the apparatus essential to the invention, namely through a quartz tube furnace with a stacked arrangement of a plurality of ring crucibles.

FIG. 1 shows a quartz tube furnace 1 which contains a vacuum chamber 2 with a vertical axis A—A. Between a charging cover 3 and an upper annular flange 4 and a lower annular flange not shown a furnace wall 6 made of a quartz tube with an outside diameter of 700 mm is held hermetically tight by means of tension anchor 7. The furnace body 6 is surrounded externally and coaxially by a spiral induction coil 8 which consists of a metal band of copper with a rectangular cross section, whose longest cross sectional axis is parallel to the furnace axis A—A.

The gaps 9 between the individual windings 10 have approximately the same vertical width throughout their length. The vertical dimensions of the rectangles, however, are different, and in the middle of the coil (inside) they have a maximum dimension "$h_i$" and at the ends of the coil (outside) they have a minimum dimension "$h_a$". The ratio of "$h_i$" to "$h_a$" is, for example, about 1.6. Thus the field and energy compensation is achieved at the otherwise disadvantaged ends of the coil. When in operation the induction coil 8 is connected to a generator with a frequency of, for example, about 4000 Hz. A cooling coil 11 is soldered on the outside of the metal band.

These coil dimensions constitute an important contribution within the scope of an especially advantageous embodiment of the invention. Conventional induction coils, whether with or without variations at their extremities—so-called "pitch equalization"—have a maximum power density in the area of the middle of the coil, because about 30% of the electromagnetic field leaves the coil interior through the gaps between the end windings. Consequently, unless special measures are taken, the peak of the power density, and with it the maximum of the axial temperature profile, is situated in the middle of the coil, so that the temperatures in the area of the end windings can differ considerably therefrom.

This leads to an uneven temperature distribution in heated solids, e.g., in the susceptors and charge carriers. The term "susceptor" is to be understood as any body or any material that is coupled to the electromagnetic field, but especially graphite, and indeed whenever the coupling takes place through a so-called "skin effect."

Temperature gradients occurring at the coil ends are thus opposed to the formation of a uniform precision temperature field in the axial and radial direction, but this is necessary in delicate heating processes of the kind described above in which a charge is divided into a plurality of individual portions in axially stacked holders if in these holders physicochemical processes are to take place whose result is to be a quality of the end products that is to be repeatable without being degraded by charge effects. This aim, which ultimately amounts to differences of less than ±5K in the range of all of the charge holders (ring crucibles), is considerably aided by the coil geometry described above.

The inside surface of the furnace body 6 is covered with thermal insulation 12 which consists of several layers of a soft felted material—for example one made of graphite fibers—and does not couple, at least not to any appreciable extent, to the induction coil.

Insofar as this is represented in FIG. 1, the following components—from the bottom up—are arranged in the vacuum chamber 2, concentric with the furnace axis A—A: a supporting tube 13 is surrounded by a hollow cylindrical thermal insulation device 14 made of graphite, and on the latter is a hollow cylindrical heat body 16, also of graphite. On the latter rests a stack of five ring crucibles 17 which are further explained with the aid of FIG. 2 and have an outside diameter of about 500 mm.

Five single portions, P1, P2, P3, P4 and P5 of the given multiple-substance mixture or system are contained one in each of the individual ring crucibles 17 of the crucible stack. The number of ring crucibles 17 can be varied, however, and is advantageously between 2 and 10, but there is no maximum limit to the number of ring crucibles.

A vapor exhaust duct 18, also of graphite, runs from the bottom ring crucible 17 to a condenser which is not shown here but can be the same as the one in DE 31 44 284 C2 referred to above.

The uppermost ring crucible 17 is closed by a congruent crucible cover 20, likewise of graphite. On the latter rests a hollow cylindrical heat body 21, likewise of graphite, on which rests a cylindrical thermal insulating device 22 of wound graphite felt on which lies a disk 23 of hard graphite felt.

The height ratios of the heat bodies 16 (ZU) and 21 (ZO) and of the crucible stack (TS) amount approximately to $H_{ZU}:H_{TS}:H_{ZO}=1:1.2:1$, the outside diameter of the crucible stack corresponding approximately to its height. As seen in the longitudinal section, therefore, approximately quadratic ratios exist. In the operating state the cylindrical inner surfaces of the heat bodies 16 and 21 act as so-called "Lambert radiators" on the bottom of the lowermost ring crucible 17 and on the crucible cover 20, since the latter are in contact with the said inner surfaces, or vice versa. Also, it is not important that the energy radiation of all surfaces conform to the Lambert cosine law only with differences, for in the steady state a temperature equilibrium establishes itself, which is assisted by the effect of the thermal insulation devices 14 and 22.

The crucible cover 20 can be dispensed with, if desired, if instead of the hollow cylindrical body 21 in the drawing a closed heat body is used, which is not shown in the figure. Also, the heat bodies 16 and/or 21 may have different geometrical shapes and be provided with slots or grooves and with inserts of greater electrical conductivity, such as heating wires, if even greater uniformity of temperature distribution is necessary.

To charge the apparatus a tightening means 24 is removed from the charging cover 3 and the latter is swung to the side. The stack of ring crucibles 17 can now be removed upwardly. The parts 15 to 21 consisting of solid graphite form a susceptor which couples to the electromagnetic field of the induction coil 8 and thereby supplies heat energy for the fusion and purification process.

Figure 2:
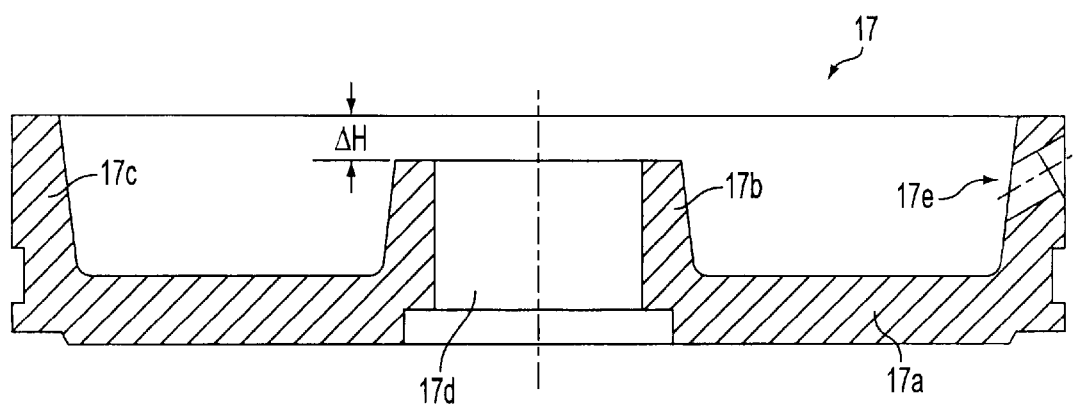
FIG. 2 shows a vertical axial section through a single ring crucible.

FIG. 2 shows a vertical axial section through a single ring crucible 17 which consists of an annular plate 17a which merges—at appropriate draft angles—with an inner rim 17b and an outer rim 17c. In this manner the solidified end product can easily "drop" out of the annular crucible. The inner rim 17b is slightly lower than the outer rim 17c. The difference "ΔH" serves for the radial escape of vapor between the individual ring crucibles 17 and for its downward flow through a vapor exhaust passage 17d and finally into the vapor exhaust duct 18. The ring crucibles 17 are compressed and polished to a high degree, so that no interfering pores are formed to trap impurities. A sloping bore 17e serves to accommodate a threaded thermocouple that is adjustable for depth.

In the purification of a molten metal at a temperature around 1000° C., temperature variations of less than ±4 K were surprisingly measured by the thermocouples in the area of the five ring crucibles 17, and in some cases even of only ±2.5 K. In the contact surface between the furnace body 6 and the thermal insulation 12 temperatures of only about 300° C. were measured. This temperature is low enough to protect a furnace body consisting of quartz against the effects of certain elements. Below 300° C., quartz is sufficiently stable even against otherwise aggressive elements such as aluminum, calcium, cerium mixed metal, magnesium, and sulfur.

The subject of the invention is operated in such a manner that, within certain windows of time of the vapor pressure curves that have been found for each component or determined by experiment, schedules are maintained for elevating the temperature and for the so-called holding stages serving for the evaporation and condensation of given components. Note the explanations given above on the subject of "non-equilibrium conditions" and "activity." The product can be produced in the greatest purity both at the end of the treatment in the ring crucibles and in the condenser in an intermediate stage when a condenser appropriately purified is inserted for the purpose.

The program data once found can be stored in a data processing apparatus with an automatic control system, such as an SPS or PLC control, and called up as often as desired for repetition and also varied and adapted for a given process.

The ring crucibles 17 do not have to be rotationally symmetrical; instead, the inner rim 17b and with it the vapor exhaust passage 17d can also be off-center in the crucible bottom. Within the crucible stack the vapor exhaust passages 17d do not have to be in line with one another, but can be arranged offset from one another on the circumference, although this is not represented graphically.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. Apparatus for evaporating given components from initial multiple-substance mixtures and multiple-substance systems at subatmospheric pressure comprising:

a furnace body;

a vacuum chamber;

ring crucibles arranged at a plurality of levels;

said ring crucibles are made of a material which acts as a susceptor towards alternating electromagnetic fields and each ring crucible has at least one vapor exhaust passage;

a lowermost ring crucible being at the bottom of said ring crucibles;

an uppermost ring crucible being at the top of said ring crucibles;

with the uppermost ring crucible being closed except for at least one vapor exhaust passage;

at least one heat body positioned under said lowermost ring crucible and above said uppermost ring crucible is made of a material which likewise acts as a susceptor towards alternating electromagnetic fields;

at least one induction coil surrounds said furnace body, said ring crucibles and said heat bodies; and said lowermost ring crucible and said uppermost ring crucible are in thermal exchange with said heat bodies.

2. An apparatus of claim 1, further comprising:

a crucible stack wherein said heat bodies are configured as hollow bodies and their interior surfaces are in contact with a crucible cover of the uppermost ring crucible and the bottom of said lowermost ring crucible.

3. An apparatus of claim 2, wherein the heat bodies are configured as hollow cylinders.

4. An apparatus of claim 1, wherein the height of the lower heat body, the height of the crucible stack and the height of the upper heat body are in a ratio of 1:(0.8 to 2.0):1.

5. An apparatus of claim 1, wherein the height of the crucible stack is in a ratio to its outside diameter of 1:(0.2 to 1.5).

6. An apparatus of claim 1, further comprising:

a thermal insulating device wherein the uppermost heat body is closed at the top by said thermal insulating device.

7. An apparatus of claim 1, further comprising:

a flat ring wherein the lowermost heat body rests on said flat ring made of a susceptor material; and a hollow cylindrical thermal insulating device wherein said flat ring disposed on said hollow cylindrical thermal insulating device.

8. An apparatus of claims 7, further comprising:

a vapor exhaust tube in communication with the bottom of said lowermost ring crucible;

an annular disk which provides a passageway for said vapor exhaust tube; and said thermal insulating device provides a passageway for said vapor exhaust tube to a condenser.

9. An apparatus of claim 1, wherein the induction coil consists of a spiral metal band and the cross section of said spiral metal band in the middle of the axial length of the induction coil is greater than at the ends of the induction coil.

10. An apparatus of claim 9, where the induction coil is a rectangle in cross section, and has gaps and windings of substantially equal size on the entire length of said spiral metal band, and the longest axis of the rectangle is axis-parallel and in. the center of the coil and has a maximum dimensions and a minimum dimension at the coil ends.

11. An apparatus of claim 10, wherein the ratios of the maximum dimension to the minimum dimensions are between 1.1 and 4.0.

12. An apparatus of claim 9, wherein the induction coil consists of a hollow shape.

13. An apparatus of claim 1, wherein the furnace body consists of a quartz tube which is lined on its inside with a thermal insulation of a soft felted material.

* * * * *